United States Patent [19]
Engfer

[11] 3,729,211
[45] Apr. 24, 1973

[54] PNEUMATIC SUSPENSION FOR A MOTORCAR

[75] Inventor: Ortwin Engfer, Gerlingen, Germany

[73] Assignee: Robert Bosch GmbH, Stuttgart, Germany

[22] Filed: Mar. 12, 1971

[21] Appl. No.: 123,528

[30] Foreign Application Priority Data

Mar. 14, 1970 Germany................P 20 12 203.6

[52] U.S. Cl.............................280/124 F, 267/65 D
[51] Int. Cl...............................................B60g 17/04
[58] Field of Search ..............280/124 F; 267/65 D, 267/65 R

[56] References Cited

UNITED STATES PATENTS

| 3,574,352 | 4/1971 | Elliott | 267/65 D |
| 3,558,156 | 1/1971 | Jackson | 280/124 F |
| 3,606,375 | 9/1971 | Jackson | 280/124 F |

*Primary Examiner*—Philip Goodman
*Attorney*—Michael S. Striker

[57] ABSTRACT

A pneumatic suspension for a motorcar has a level indicator switch having a high load position and a low load position in which it is connected by first and second switches with an electric motor-compressor, and an electromagnetic relief valve, respectively. A third switch connects the motor-compressor parallel to the level indicator switch into the circuit. The three switches are part of a control switch means, and are operated by a spring biassed pressure responsive element having a piston portion in a pressure chamber communicating with the pneumatic cylinder and piston means by which the chassis is supported on a wheel shaft. By use of a strong spring for the pressure responsive element, the operation of the first switch takes place only at a predetermined high load.

9 Claims, 4 Drawing Figures

Patented April 24, 1973 3,729,211

INVENTOR.
ORTUIN ENGFER
BY

Patented April 24, 1973　　　　　　　　3,729,211

INVENTOR.
ORTWIN ENGFER
BY
Attorney

PNEUMATIC SUSPENSION FOR A MOTORCAR

BACKGROUND OF THE INVENTION

The present invention relates to a pneumatic suspension for supporting a chassis on a wheel shaft. Pneumatic suspensions of this type are known which include an electric level indicator switch responsive to relative motion between the chassis and the wheel shaft, a motor compressor controlled by a relay, and an electromagnetic relief valve for relieving the cylinder and piston means by which the chassis is supported on the wheel shaft.

Elastic pneumatic suspensions according to the prior art have the disadvantage that an additional load acts not only on the controlled wheel shaft, but also on the other wheel shaft of the motorcar, so that an additional load may cause a slanted position of the chassis, which has a detrimental influence on the direction of the beam of the headlights.

It is one object of the invention to overcome this disadvantage, and to provide a pneumatic suspension arrangement in which the level regulation takes place only at a predetermined high load, for example, if more than two persons enter the motorcar.

Another object of the invention is to facilitate the changing of tires, and the raising of the motorcar for servicing operations without disconnection of the elastic pneumatic suspension, and without any danger for the battery.

Another object of the invention is to protect the cylinder and piston means of the pneumatic suspension against extremely low pressure, and to protect the motorcar from overloads.

With these objects in view, the present invention provides a pressure responsive control switch means with three switches which, depending on the pressure in the pneumatic suspension, effect in one of two pressure stages, respectively, a pressure variation, and in the third pressure stage adjustment of extremely low pressure.

An embodiment of the invention comprises a wheel shaft; a chassis; pneumatic cylinder and piston suspension means for mounting the chassis on the wheel shaft; an electric motor compressor, preferably including a relay, and an electromagnetic relief valve communicating with a cylinder and piston means for raising and lowering the chassis, respectively; level indicator switch means moving to a first position when the chassis is too low and to a second position when the chassis is to high; and pressure responsive control switch means including a pressure chamber communicating with the cylinder and piston means, a pressure responsive element in the pressure chamber, and first, second, and third switches controlled by the pressure responsive element dependent on the pressure in the cylinder and piston means and on the corresponding pressure in the pressure chamber.

In accordance with the invention, the first switch connects the level indicator switch means in the first position with the relay of the motor compressor, and the second switch connects the level indicator in the second position with the electromagnetic relief valve. Consequently, the motor compressor is started when the load on the chassis is increased, and the relief valve is opened when the load on the chassis is reduced. The third switch effects energizing of the motor compressor when the pressure in the cylinder and piston means and the pressure chamber is too low, and is connected in parallel with the level indicator switch means.

The relay of the motor compressor and the electromagnetic relief valve are connected in parallel to a voltage source, and the movable switch arm of the level indicator switch means is connected to ground, and by the first and second switches with the motor compressor and relief valve. The third switch directly connects the relay of the motor compressor with ground.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
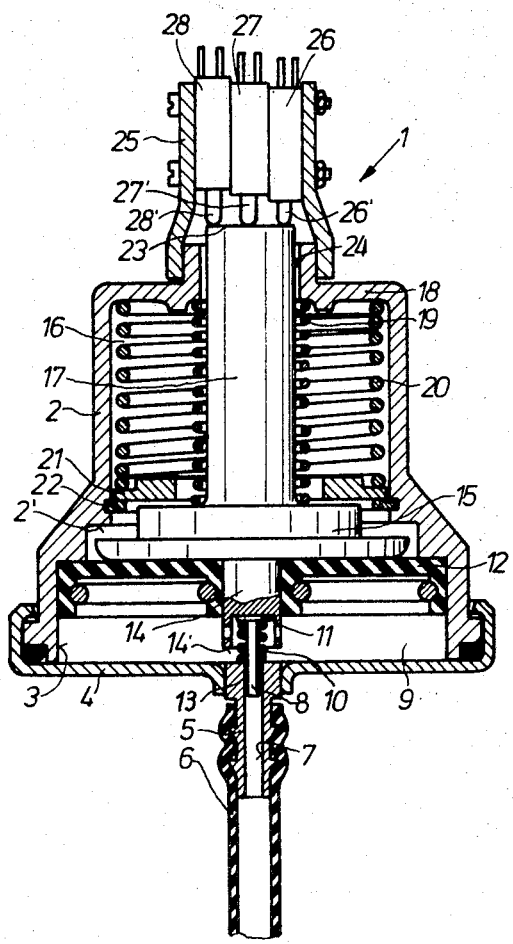
FIG. 1 is an axial sectional view illustrating a pressure responsive control switch according to a preferred embodiment of the invention.
Figure 4:
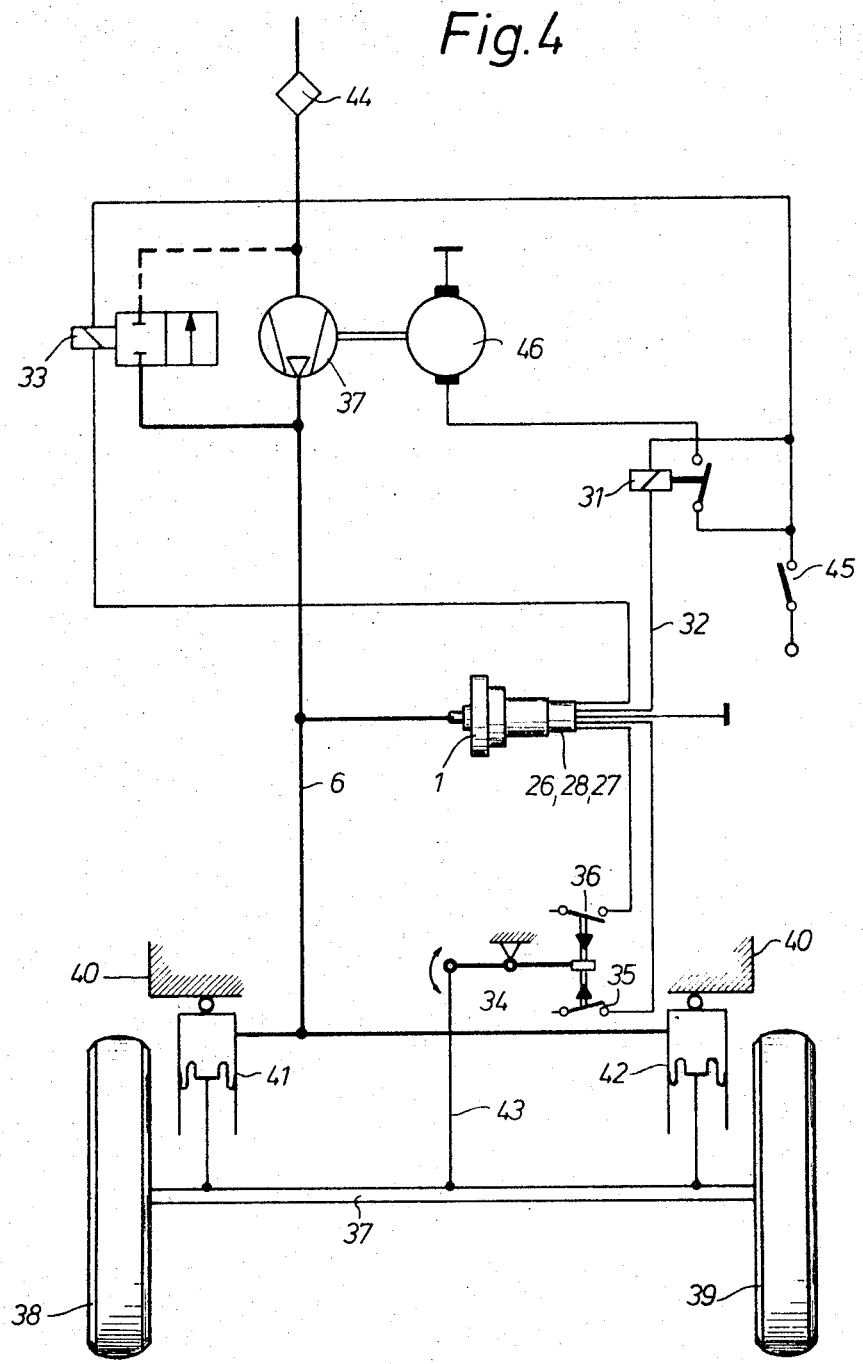
FIG. 4 is a schematic view of a pneumatic suspension controlled in accordance with the invention, including air conduits, and electric connections.

Referring now to the drawings, and particularly to FIG. 1 which illustrates a pressure responsive control switch 1 according to the invention, a stepped cylindrical housing 2 has a cylindrical pressure chamber 9 bounded by a cylindrical surface 3 of housing 2, and by a closure member 4 which is secured to the rim of housing 2 and sealed by a sealing ring. The bottom closure 4 has a connector 5 for a pressure conduit 6 communicating with the cylinders of pneumatic cylinder and piston means 41 and 42 which connect a wheel shaft 37 with wheels 38 and 39 with a chassis 40, as best seen in FIG. 4.

The tubular connector 5 has a bore 7 into which the stem of a throttle pin 8 is inserted whose head projects into the pressure chamber 9, and is biassed by a spring 10 to press the head of throttle pin 8 against an end face 11 of the end portion 14 of a stem 17 which has a stepped flange 15 abutting an elastic piston 12 which is secured by a ring to the end portion 14, and moves with the stem 17, 15, so that the element 14, 15, 17 and 12 constitute a pressure responsive element responding to the pressure in chamber 9, which corresponds to the pressure in the pneumatic suspension cylinder and piston means 41 and 42.

Pneumatic suspension cylinder and piston means 41 and 42 communicate with pressure chamber 9 through a throttling gap 13 between throttle pin 8 and the inner surface of connector 7, so that the pressure in pressure chamber 9 is reduced.

The end face 11 on which the head of throttle pin 8 abuts due to the action of spring 10, is the bottom of a recess in the end portion 14 which is bounded by a circular wall having bores communicating with pressure chamber 9.

The stepped housing has an inner annular shoulder 2' on which the larger portion of flange 15 abuts when a predetermined maximum pressure in pressure chamber 9 is reached, and the membrane piston portion 12 is correspondingly deformed.

A weak coil spring 19 abuts at one end the upper portion 18 of the housing, and at the other end flange 15 so that piston 12 is urged to a normal position. A strong spring 20 has ends abutting the top portion 18 of the housing, and a ring 21 which abuts a spring ring 22 inserted into a groove in the housing so that spring 20 is confined in the housing portion 16, without normally influencing flange 15 from which ring 22 is spaced a small axial distance.

However, if the pressure in pressure chamber 9 increases, and piston 12 is pressed upward so that the pressure responsive element 17, 14, 12, 15 is displaced, this small diameter portion of flange 15 will engage ring 22 and compress the strong spring 20 before the large diameter portion of flange 15 abuts the annular abutment shoulder 2' of the housing.

Movement of flange 15 into engagement with ring 21 will require only small pressure for overcoming the force of the weak spring 19, but further movement of flange 15, requiring compression of the strong spring 20, will require a far greater pressure in the pressure chamber 9, and in the pneumatic suspension.

The upper end of the stem 17 forms an actuating portion projecting out of the tubular portion 24 of the top wall 18 of housing 2. A tubular bushing 25 is mounted on portion 24, and supports three switches 26, 27, 28 in parallel positions and staggered relative to each other to the direction of movement of stem 17 and its actuating end face 23 on which the actuators 26', 27', 28' abut.

The first, second, and third switches 28, 27, 26 are staggered distances of about 2 mm, so that the actuating portions 28', 27', 26' project different distances out of the respective spring housings into engagement with the actuating end face 23.

FIG. 1 shows the control switch 1 in a normal intermediate position in which the lower end 14' of stem portion 14 has a distance of 1.5 mm from the bottom closure 4, while the top face of flange 15 has a distance of 1.5 mm from the abutment shoulder 2' of housing 2. Consequently, the stem 17, 14 can move with its flange 15 with 1.5 mm, and downward also 1.5 mm, and has a complete stroke of 3 mm.

Referring now to FIG. 4, the pneumatic cylinder and piston means 41, 42 connect a chassis 40 with the wheel shaft 37 carrying two wheels 38 and 39. A level indicator switch has a switch arm 34 mounted on a fulcrum on chassis 40 for angular movement, and is connected by a linkage 43 to the shaft 37. Switch arm 34 has two positions in which switches 36 and 35 are connected to ground, as schematically shown in FIG. 3.

The air conduit 6 connects the cylinders of the pneumatic suspension 41 and 42 with the pressure chamber 9 of control switch 1, as explained with reference to FIG. 1, and also with a compressor 37 driven by an electric motor 46, and pumping air from an air filter 44 into the cylinders of the pneumatic suspension means 41 and 42, if motor 46 is energized. The motor 46 is connected in series with the contact of a relay 31 which is connected with two parallel switches 26, 28 of the control switch 1, as best seen in FIG. 3. The air conduit 6 is also connected to a relief valve 33 which has a normal position shown in FIG. 4, in which relief valve 33 is closed, and an actuated position in which the air conduit 6 is connected with a return conduit to the inlet of compressor 37. The relief valve 33 is shifted by electromagnetic means, schematically shown in FIG. 4 to be connected by a main switch 45 to a voltage, and being also connected with switch 27 of control switch means 1, as best seen in FIG. 3.

Figure 3:
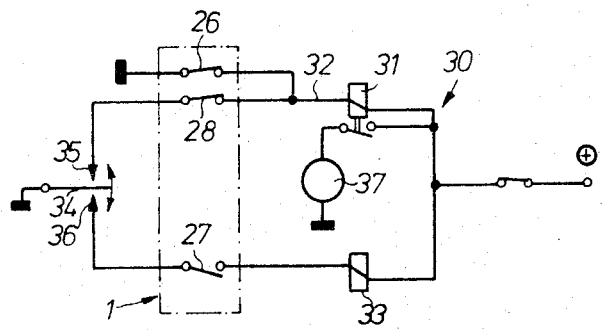
FIG. 3 is a circuit diagram of the control circuit of the pneumatic suspension shown in FIG. 4.

FIG. 3 shows only compressor 37, and it will be understood that its motor 46 is controlled by the relay 31. The winding of relay 31 is connected in series with switch 28, contact 35, and switch arm 34 to ground. Relay 31 is also connected through switch 26 with ground. The electromagnet of relief valve 33 is connected to switch 44, and in series with switch 27 of the control switch means 1, as schematically indicated by a rectangle appearing in chain lines. Relief valve 33 and switch 27 re connected through contact 36 and switch arm 34 to ground.

Switches 26 and 28 are normally closed, and switch 27 is normally open, and these switches are opened and closed by the movement of the pressure responsive element 17, 15, 14, 12, as described with reference to FIG. 1.

If the pressure in the suspension cylinders 41, 42 has dropped considerably, for example to 0.5 atm., so that the end 14' of stem 14 abuts bottom closure 4 due to the action of the weak spring 19, the switch 26 is closed, and a current flows through the relay 31 and switch 26 to ground, entirely independently of the position of the level indicator switch means 34. Relay 31 starts motor 46 of compressor 37 which pumps air into the cylinders of the pneumatic suspension 41, 42 so that the pressure in the same rises, resulting in a corresponding pressure rise in the pressure chamber 9 of control switch 1 until at the pressure of 1 atm., the pressure responsive element in control switch means 1 again assumes its normal position, so that switch 26 is opened, and the compressor 37 stops. Due to the provision of switch 26, the pressure in the pneumatic suspension 41, 42 is always maintained at the desired minimum level so that damage to the cylinders and pistons of the pneumatic suspension is prevented.

The function of switch 26 is particularly necessary if the pneumatic suspension include flexible bellows.

Figure 2:
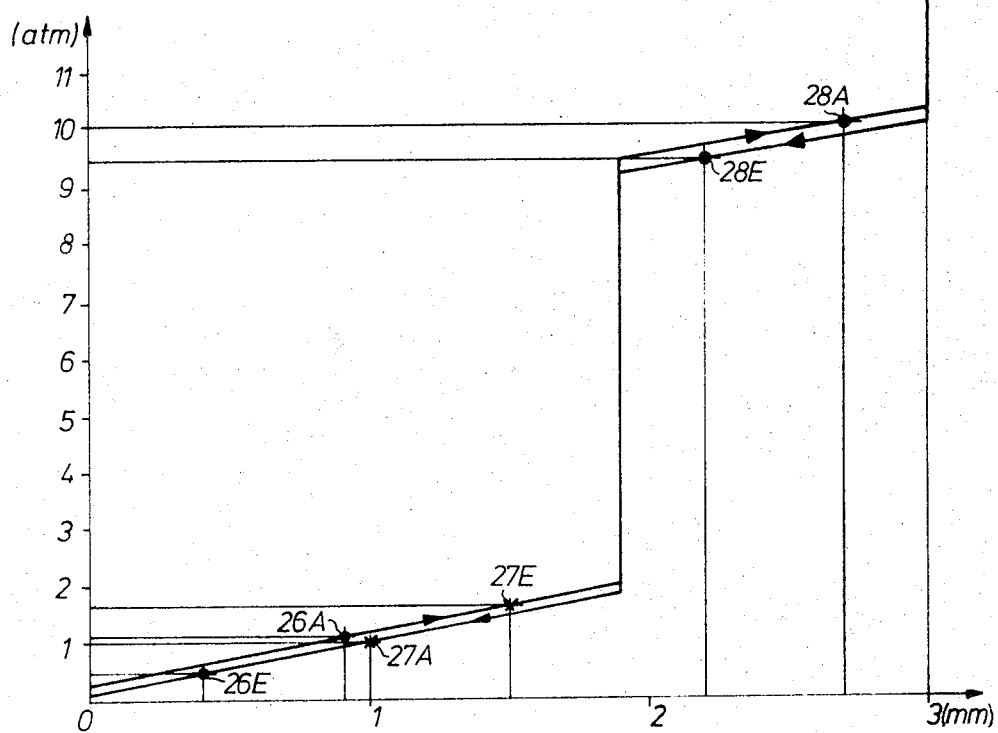
FIG. 2 is a diagram illustrating the variation of the pressure over the distance of travel of a pressure responsive element of the control switch.

The pressure function during this operation is shown in FIG. 2 between the points 26E and 26A, the character E representing start of the compressor, and the character A representing stopping of the compressor. It will be seen that the pressure responsive element moves less than 1 mm to maintain the pressure at 1 atm.

Switch 27 is operated by the pressure responsive element when the load on chassis 40 is reduced, so that the same rises and actuates the level indicator switch 34 to connect the electromagnetic valve 33 through switch 27 and contact 36 to ground so that a current flows through the electromagnetic relief valve 33 and the same opens until the existing pressure in the pneumatic suspension 41 has dropped to 1 atm. When the chassis 40 rises due to the reduced load, there is still comparatively high pressure in pressure chamber 9 and switch 27 is closed. When the relief valve 33 is operated to reduce the pressure to 1 atm., the pressure responsive element moves to its normal position opening switch 27 so that relief valve 33 closes.

Upon a small load increase, chassis 40 moves downward and level indicator switch 35 closes. The circuit of compressor 37 is closed. The compressor 37 supplies the pneumatic suspension cylinders 41, 42, until the chassis reaches its original level. Then level indicator switch 35 opens and compressor 37 is stopped.

Upon a great load increase chassis 40 moves also downward and level indicator switch 35 closes. Now compressor 37 supplies the pneumatic cylinders 41, 42 for a long periode and stops only, if the chassis reaches its original level. Should the chassis however not lift, the high pressure prevails in the pressure chamber 19 of the controll switch 1, so that flange 15 abuts abutment shoulder 2' and also engages ring 21 for compressing the strong spring 20 a small distance. During this filling period, the pressure follows the vertical line in FIG. 2, since a great counterforce exerted by the strong spring 20 has to be overcome. When the maximum pressure is reached, the switch 28 disconnects the filling of the cylinders of the pneumatic suspension 41,42, whereupon the circuit of the relay 31 of compressor 37 is interrupted.

FIG. 2 shows the steep increase of the pressure, and the regulation between the points 28E and 28A.

The throttling duct 13 serves the purpose to prevent response of the pressure responsive element of control switch means 1 to dynamic variations and fluctuations in the hydraulic system. Since the throttling duct is very narrow, it is necessary to provide axial movability of throttle pin 8, so that the annular throttling duct 13 is continuously cleaned.

As can be seen from FIGS. 3 and 4, the arrangement of the invention permits the changing of tires, and the raising of the motorcar by lifting apparatus to a servicing position in which it is accessible from below. The chassis 40 is raised, so that its distance from the wheel shaft 37 is increased. The level indicator switch means 34 assumes its position for a reduced load, so that contact 36 is connected to ground, and the relief valve 33 is energized to relief the pressure in the pneumatic suspension. When at the point 27A in FIG. 2, a pressure of 1 atm. is reached, switch 27 opens, and the relief valve 33 closes so that a pressure of 1 atm. is maintained in the system.

Due to this arrangement, it is not necessary to disconnect the pneumatic suspension when a tire is changed, or the car is raised. Since the electromagnetic relief valve 33 is not normally energized, no current is consumed, and the battery does not have to supply a current continuously, and is consequently protected from being completely discharged.

It will be understood that each of the elements described above, or two or more together, may also find a useful application in other types of pneumatic suspensions differing from the types described above.

While the invention has been illustrated and described as embodied in a pneumatic suspension with a pressure responsive control switch electrically operating a compressor and a relief valve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Pneumatic suspension for a motorcar, comprising a wheel shaft; a chassis; pneumatic cylinder and piston means for mounting said chassis on said wheel shaft; an electric motor compressor and an electromagnetic relief valve communicating with said cylinder and piston means for raising and lowering said chassis, respectively; level indicator switch means responsive to the relative position between said chassis and said wheel shaft to move to a first low-load position when said chassis is too low and to a second high-load position when said chassis is too high; and pressure responsive control switch means including a housing forming at one end a cylindrical pressure chamber communicating with said cylinder and piston means, first, second, and third switches mounted at the other end of said housing adjacent each other, a pressure responsive element having at one end a piston portion located in said cylindrical pressure chamber, and having at the other end an actuating portion for operating said first, second and third switches dependent on the pressure in said cylindrical pressure chamber and in said cylinder and piston means, and biassing means in said housing biassing said pressure responsive element against the pressure in said pressure chamber, said first switch connecting said level indicator switch means in said first position with said motor-compressor, and said second switch connecting said level indicator means in said second position with said electromagnetic relief valve so that said motor-compressor is started when the load on said chassis is increased, and said relief valve is opened when the load on said chassis is reduced, and said third switch effecting energizing of said motor-compressor when the pressure in said cylinder and piston means and in said pressure chamber is too low, and being connected in parallel with said level indicator switch means.

2. Pneumatic suspension as claimed in claim 1 wherein said switches are disposed in said housing staggered in the direction of movement of said pressure responsive element so that said first, second, and third switches are operated in different positions of said pressure responsive element depending on the pressure in said pressure chamber and on the force of said spring means.

3. Pneumatic suspension as claimed in claim 2 wherein said switches are parallel, and wherein said actuating portion of said pressure responsive element abuts said switches.

4. Pneumatic suspension as claimed in claim 2 wherein said spring means include a weak spring having one end abutting said housing and said pressure responsive element for urging the same in one direction against the pressure in said pressure chamber to a normal position if a predetermined normal pressure prevails in said pressure chamber, and beyond said normal position to a low pressure position if the pressure in said pressure chamber and in said cylinder and piston means drops below said normal pressure, and a strong spring abutting at both ends on portions of said housing, and being engaged by said pressure responsive element when the same moves in the opposite direction out of said normal position due to increased pressure in said pressure chamber so that a substantial increase of the pressure in said cylinder and piston means and of the load acting on said chassis is required for moving said pressure responsive element in said opposite direction against the action of both said weak and strong springs.

5. Pneumatic suspension as claimed in claim 4 wherein said pressure responsive element operate said third switch in said low pressure position so that said motor compressor is energized, and again in said normal position so that said motor compressor is deenergized at normal pressure in said cylinder and piston means, and in said pressure chamber.

6. Pneumatic suspension as claimed in claim 4 wherein said pressure responsive element operates said first switch to energize said motor-compressor when the load on said chassis is increased a predetermined amount, and thereby the pressure in said pressure chamber is increased to a predetermined pressure sufficient to move said pressure responsive element in said opposite direction against the action of said strong spring.

7. Pneumatic suspension as claimed in claim 4 wherein said pressure responsive element operates said second switch when the load on said chassis is reduced so that said relief valve is opened whereby the pressure in said cylinder and piston means is reduced to said normal pressure, whereupon said second switch is again operated by said pressure responsive element to close said relief valve.

8. Pneumatic suspension as claimed in claim 4 wherein said pressure responsive element operates said first switch to energize said motor-compressor when the load on said chassis is increased a predetermined amount, and thereby the pressure in said pressure chamber is increased to a predetermined pressure sufficient to move said pressure responsive element in said opposite direction against the action of said strong spring; wherein said pressure responsive element operates said second switch when the load on said chassis is reduced so that first said relief valve is opened whereby the pressure in said cylinder and piston means is reduced to said normal pressure, whereupon said second switch is again operated by said pressure responsive element to close said relief valve; wherein said pressure responsive element operates said third switch in said low pressure position so that said motor compressor is energized, and again in said normal position so that said motor compressor is deenergized at normal pressure in said cylinder and piston means, and in said pressure chamber.

9. Pneumatic suspension as claimed in claim 8 wherein said pressure responsive element includes a stem having said actuating portion at said other end, a flexible membrane forming said piston portion mounted at said one end, and a flange on said one end abutting said membrane; and wherein said housing has an annular shoulder on which said flange abuts in an end position of said pressure responsive member when said weak and strong springs are deformed by said pressure responsive element to a predetermined degree at a predetermined high load.

* * * * *